(12) United States Patent
Stephen et al.

(10) Patent No.: US 9,846,079 B2
(45) Date of Patent: Dec. 19, 2017

(54) RECIRCULATING ETALON SPECTROMETER

(71) Applicant: The United States of America as represented by the Administrator of the National Aeronautics and Space Administration, Washington, DC (US)

(72) Inventors: Mark A. Stephen, Catonsville, MD (US); Molly E. Fahey, Washington, DC (US); Michael A. Krainak, Fulton, MD (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/190,727

(22) Filed: Jun. 23, 2016

(65) Prior Publication Data
US 2017/0082491 A1   Mar. 23, 2017

Related U.S. Application Data

(60) Provisional application No. 62/219,898, filed on Sep. 17, 2015.

(51) Int. Cl.
| | |
|---|---|
| *G01B 9/02* | (2006.01) |
| *G01J 3/45* | (2006.01) |
| *G02B 5/28* | (2006.01) |
| *G02B 5/122* | (2006.01) |
| *G01J 3/26* | (2006.01) |

(52) U.S. Cl.
CPC . *G01J 3/45* (2013.01); *G01J 3/26* (2013.01); *G02B 5/122* (2013.01); *G02B 5/284* (2013.01)

(58) Field of Classification Search
CPC .......... G02B 5/12; G02B 5/122; G02B 5/124; G02B 5/284; G01J 3/26; G01J 3/45
See application file for complete search history.

(56) References Cited

U.S. PATENT DOCUMENTS

| | | | |
|---|---|---|---|
| 6,243,170 B1 * | 6/2001 | Ershov ...................... | G01J 3/02 356/326 |
| 6,577,398 B1 * | 6/2003 | Ducellier ........... | G02B 6/29395 356/519 |
| 6,747,741 B1 * | 6/2004 | Kleinschmidt ........... | G01J 3/26 356/454 |

(Continued)

*Primary Examiner* — Michael A Lyons

(57) ABSTRACT

Systems, methods, and devices may provide an optical scheme that achieves simultaneous wavelength channels and maintains the resolution and luminosity of an etalon. Various embodiments may provide a method to optically recirculate the light reflected from the etalon back through the same etalon at new angles. Various embodiments create an etalon spectrometer based on angular dispersion without moving parts and without losing the light that is not initially transmitted. Various embodiments may provide a spectrally-resolved receiver and/or transmitter. Various embodiments may provide a system including a retro-reflector, a detector or transmitter array, and an etalon disposed between the retro-reflector and the detector or transmitter array, wherein the retro-reflector is configured to redirect light reflected by the etalon back to the etalon at a different angle of incidence than an original angle of incidence on the etalon of the light reflected by the etalon.

17 Claims, 8 Drawing Sheets

(56) References Cited

U.S. PATENT DOCUMENTS

| | | | | |
|---|---|---|---|---|
| 7,633,624 B1* | 12/2009 | Wickholm | ......... | G01B 9/02058 356/450 |
| 2005/0270539 A1* | 12/2005 | Abbink | ................... | G01J 3/453 356/451 |
| 2010/0290025 A1* | 11/2010 | Parker | ..................... | G01S 7/497 356/3 |

* cited by examiner

RECIRCULATING ETALON SPECTROMETER

CROSS REFERENCE TO RELATED APPLICATIONS

This application claims priority to U.S. Provisional Patent Application No. 62/219,898 filed Sep. 17, 2015 entitled "Recirculating Advanced Coupled-cavity Etalon Receiver (RACER), the entire contents of which are hereby incorporated by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates generally to optical spectroscopy, and more particularly to light recirculation schemes for spectrometers.

BACKGROUND OF THE INVENTION

The scanning Fabry-Perot etalon spectrometer is a ubiquitous tool for high-resolution optical spectroscopy. In the most common configuration, the optical path length between the etalon mirrors is (thermally or mechanically) scanned through resonant optical wavelengths that are transmitted in time sequential order. Another common option is to tune the angle of incidence at which the light impinges on the etalon to change the passband. Very high-resolution wavelength measurements can be achieved using etalons. Etalons can be used as tunable filters where the tuning is accomplished by either angle or optical path length changes. By continuously tuning these parameters, one can use an etalon as a high-resolution spectrometer.

Although etalons are capable of very high wavelength resolution, in general, they only transmit a very narrow wavelength band at a time coinciding with the current optical path length and angle of incidence (AOI). A key measure of etalon performance is the finesse, the ratio of the free spectral range (FSR) to the full-width at half-maximum (FWHM) transmission bandwidth. A narrower filter (with the same free spectral range) rejects more out of band light. This means that as the resolving power (and finesse) are increased, more light is required to make a narrow-band measurement. In present systems, the light that is reflected is lost and only a very narrow band of light is measured. Scanning allows for the pass-band of the light to be changed but only one passband can be measured at any given time. This means that optical power (or integration time) needs to increase as the filter narrows so improving the resolution comes at the price of optical efficiency. Another common usage is to send a non-collimated beam through an etalon, which yields a well-known ring pattern and passes different wavelengths at different angles but is equally lossy. In contrast, a grating spectrometer splits the light of multiple wavelengths into different angles. This yields simultaneous wavelength measurements but with lower resolution (and generally high loss). Another technology that has seen recent success is the Virtually Imaged Phased Array (VIPA). A VIPA can suffer from some of the same problems as gratings because the light is split into multiple orders and there is insertion loss in getting the light into the VIPA. The most desirable spectrometer is one that has simultaneous, continuous wavelength coverage like a grating spectrometer but maintains the resolution and luminosity of an etalon.

SUMMARY

Various embodiments may provide a novel optical scheme that achieves simultaneous wavelength channels and maintains the resolution and luminosity of an etalon. Various embodiments may provide a method to optically recirculate the light reflected from the etalon back through the same etalon at new angles. Various embodiments create an etalon spectrometer based on angular dispersion without moving parts and without losing the light that is not initially transmitted. The various embodiments may be simpler, more compact and more efficient than current technologies. The light transmitted at different angles by the various embodiments may be separated using a transform lens to focus each angle onto a unique spot in the focal plane. Various embodiments provide optical designs that allow for angle-tuned transmission of an etalon. In various embodiments by changing the distance of the input source relative to the optical axis, the AOI changes and therefore the transmission wavelength changes. Embodiment optical designs take the light rejected by the initial etalon reflection and redirect it back to the etalon at a higher AOI. The light reflected the second time is reflected again at a further increased AOI and this process may be repeated until the light has all dissipated. The angles achieved in the various embodiments may be spaced closely, limited only by the input beam spot size, the gap between the retro-reflecting mirrors, and optical aberrations. The light will continue to recirculate at ever increasing angles until no light remains or the beam gets clipped by the outer edge of the optics. In the various embodiments, each wavelength may be imaged to a unique spot in the focal plane side of the etalon and may be measured with a detector array or coupled into individual optical fibers, for example.

Various embodiments may provide a system including a retro-reflector, a detector or transmitter array, and an etalon disposed between the retro-reflector and the detector or transmitter array, wherein the retro-reflector is configured to redirect light reflected by the etalon back to the etalon at a different angle of incidence than an original angle of incidence on the etalon of the light reflected by the etalon. In various embodiments the system may further include a first lens disposed between the retro-reflector and the etalon, and a second lens disposed between the etalon and the detector or transmitter array. In various embodiments the etalon may be a Fabry-Perot etalon. In various embodiments the etalon may be a coupled-cavity etalon. In various embodiments the retro-reflector may be a roof prism comprised of two mirrors with a center space between the two mirrors, a saw-tooth retro-reflector, a cats-eye reflector, or a corner cube mirror. In various embodiments the detector or transmitter array may be a detector array and the retro-reflector may be configured such that the different angle of incidence is a higher angle than the original angle of incidence. In various embodiments the first lens may be a collimating lens and the second lens may be a focusing lens. In various embodiments the system may be a Light detection and ranging system. In various embodiments the detector or transmitter array may be a transmitter array.

Various embodiments may provide a method including receiving a beam of light at an original angle of incidence at an etalon, transmitting a first portion of the beam of light through the etalon to a detector array, reflecting a second portion of the beam of light to a retro-reflector, reflecting the second portion of the beam of light from the retro-reflector back to the etalon at a different angle of incidence than the original angle of incidence, and transmitting at least a portion of the second portion of the beam of light through the etalon to the detector array. In various embodiments the method may further include successively repeating the reflecting steps between the retro-reflector and the etalon such that each subsequent portion of the beam of light is incident on the etalon at a higher angle of incidence than a previous portion of the beam of light.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments may provide a spectrally multiplexed Lidar receiver that may enable improved measurement efficiency, signal-to-noise-ratio, and spectral resolution for near-term, space-based and non-space-based Lidar instruments. Various embodiments may provide the Recirculating Etalon Spectrometer light recirculation technique to greatly increase instrument throughput when compared with current Lidar receivers. Various embodiment Recirculating Etalon Spectrometers may provide a new type of spectrometer that substantially improves throughput, resolution, and ruggedness. The various embodiments may improve multiple Lidar instrument concepts to enable lower cost and higher performance measurements.

Various embodiments may provide the resolution typically only achieved with Fourier Transform Infra-Red (FTIR)/Michelson spectrometers or scanning etalons. However, the various embodiments may have two critical advantages over Fourier Transform Infra-Red (FTIR)/Michelson spectrometers or scanning etalons in that the various embodiments may not require mechanical scanning and may operate in all channels simultaneously. This may be contrasted with a scanning system that can only use the photons from one channel at a time and discards the rest. Thus, the various embodiments may provide an improvement in photon efficiency. Additionally, current scanning spectrometer's inability to transmit multiple channels simultaneously makes it too inefficient to use given the power constraints in many applications. A current grating-based spectrometer can be used for multiple channels at once, but at significantly lower wavelength resolution, insufficient for differentiating between closely-spaced laser wavelengths required in many applications. Current grating-based spectrometers are also relatively high-loss (>50%) devices because they are highly polarization sensitive and the laser return can have a random polarization. The various embodiments enable simultaneous, high-resolution, parsing of multiple wavelength channels, thereby overcoming shortcomings in current scanning spectrometers and grating-based spectrometers.

Figure 1:
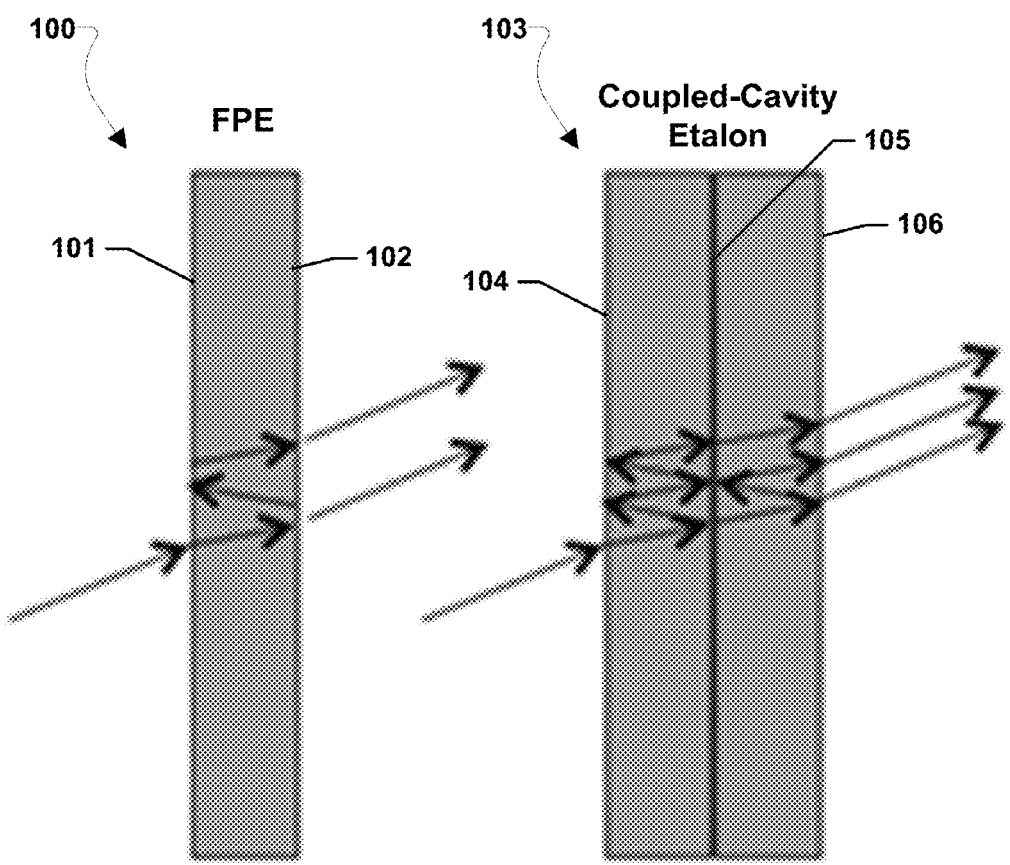
FIG. 1 is a block diagram illustrating an example Fabry-Perot etalon (FPE) and an example coupled-cavity etalon according to various embodiments.

Fabry-Perot etalons (FPE) consist of two parallel mirror surfaces that form an optical cavity. An example FPE 100 suitable for use in the various embodiments is illustrated in FIG. 1. The FPE 100 includes a first mirror surface 101 parallel to a second mirror surface 102. FPEs are band pass (comb) filters with wavelength and angle-dependent transmission. FPEs may be designed such that the selected wavelength of light passes through the FPE, while other wavelengths are rejected by the FPE. As illustrated in FIG. 1, light passing into the FPE 100 is filtered and filtered light is transmitted out of the FPE 100. FPEs can achieve very narrow bandwidths, but the resolution is limited by the shape of their pass band; this shape is roughly triangular with a narrow, high-transmission peak and a wide low-transmission band. This introduces error in spectral measurements because it is difficult to differentiate adjacent wavelengths. Although etalons are capable of very high wavelength resolution, in general, they only transmit a very narrow wavelength band at a time coinciding with the current optical path length and angle of incidence (AOI). A key measure of etalon performance is the finesse, the ratio of the free spectral range (FSR) to the full-width at half-maximum (FWHM) transmission bandwidth. A narrower filter (with the same free spectral range) rejects more out of band light. This means that as the resolving power (and finesse) are increased, more light is required to make a narrow-band measurement.

Various embodiments improve the FPE filter shape and performance with a coupled-cavity etalon in which two etalons are fused together to make a single, solid, 3-mirror, multi-cavity etalon (or multi-mirror etalon), referred to herein as a coupled-cavity etalon. An example, coupled-cavity etalon 103 is illustrated in FIG. 1. The fusion of the two etalons to form the coupled-cavity etalon 103 results in a first mirror surface 104, a second mirror surface 105, and a third mirror surface 106. The coupled-cavity etalon has been shown analytically to be superior to single- or multi-pass-FPEs in both contrast and steepness profile. As illustrated in FIG. 1, light passing into the coupled-cavity etalon 103 is filtered by the coupled-cavity etalon 103. Filtered light is transmitted out of the other side of the coupled-cavity etalon 103. As seen in FIG. 1, the coupled-cavity etalon 103 may provide greater filtering than the FPE 100. While FPE 100 and coupled-cavity etalon 103 are shown with two mirror surfaces and one cavity and three mirror surfaces enclosing two cavities, respectively, these are merely examples of etalons that are used to illustrate features of the various embodiments and are not intended to limit the scope of the various embodiments. Etalons with more mirror surfaces and cavities (e.g., four mirror surface and three cavity etalons, five mirror surface and four cavity etalons, more than five mirror surfaces and more than four cavity etalons, etc.) may be substituted for the FPEs and coupled-cavity etalons described herein without departing from the scope of the various embodiments. Also, the etalons may be filled with any transparent media.

Modeling results comparing a FPE and a coupled-cavity etalon show that a coupled-cavity etalon may significantly improve both in-band transmission (e.g., 12% more light may be transmitted inside the pass band) and out-of-band rejection (e.g., greater than 3 times more light may be rejected outside the pass band). The model showed that greater than 20 dB improvement in peak out-of-band rejection with coupled-cavity etalon compared to the FPE. Additionally, the etalon transmission of an FPE and coupled-cavity etalon as a function of incidence angle for three spectral channels was modeled, and the coupled-cavity etalon significantly reduced cross-talk between adjacent spectral channels (e.g., by 10 times). Alternatively, this improved out-of-band rejection allows closer channel spacing (higher resolution) with the same cross-talk between channels.

The recirculating etalon spectrometer improves the overall throughput of the science instrument, such as a Lidar instrument, by optically recirculating the light reflected from the FPE at the first angle back through the FPE at new angles. In a standalone FPE system a photon of $\lambda_1$ is transmitted and all other wavelengths are reflected and lost from the system. Adding recirculation to an FPE or coupled-cavity etalon system according to the various embodiments enables reflected light from the etalon to be redirected back to the etalon by one or more retro-reflectors, rather than escaping the system. This reflection of light back to the etalon at different angles from the original angle of incidence enables additional wavelengths of light to be filtered by the etalon, thereby increasing the photons detectable by the various embodiment systems employing recirculation when compared with standalone etalon systems.

Figure 2:
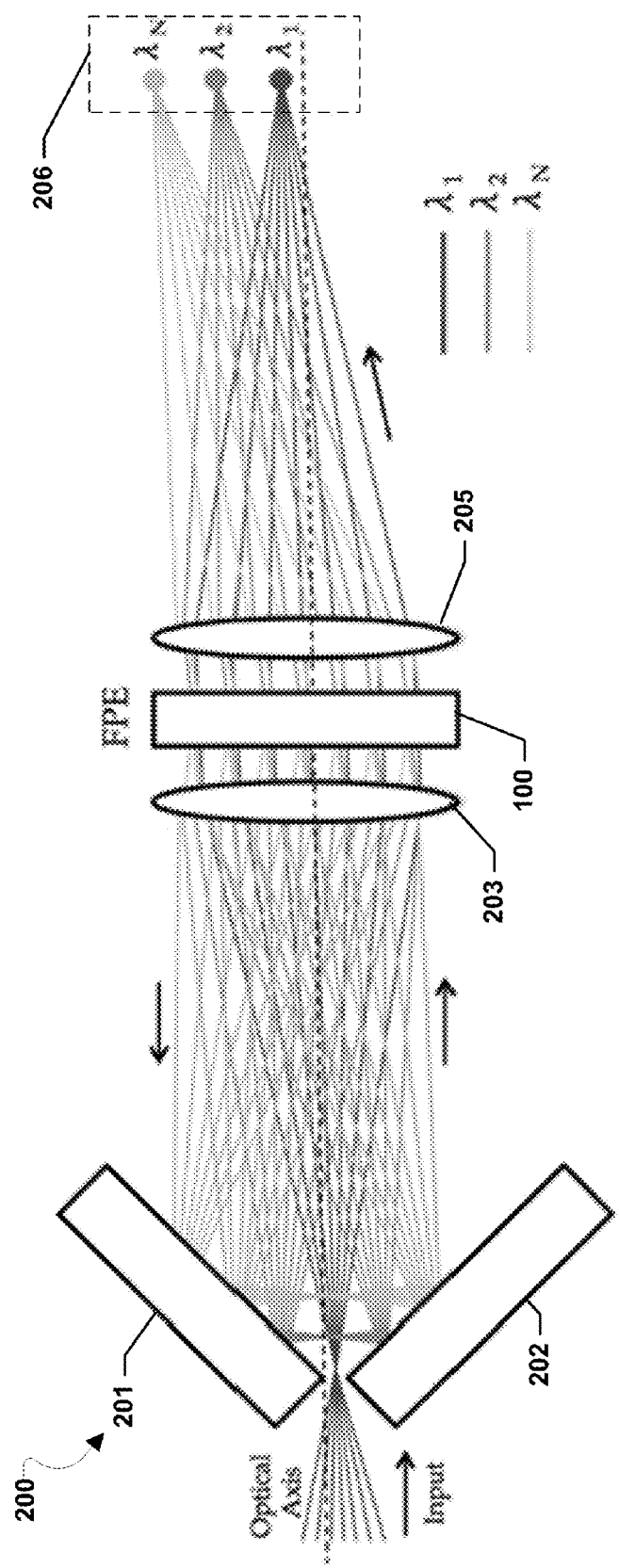
FIGS. 2-5 illustrate systems according to various embodiments.

An embodiment system 200 including a Recirculating Etalon Spectrometer is illustrated in FIG. 2. The system 200 includes a retro-reflector, such as two mirrors 201 and 202 arranged in a roof prism configuration (at ±45° relative to the optical axis) with a center space between the mirrors 201 and 202, one or more lens 203, such as one or more collimating lens, an etalon, such as a FPE 100, one or more lens 205, such as one or more focusing lens, and a detector array 206. Light may be input off the optical axis of the system 200 and focused through the lens 203 onto the FPE 100. The input light may not be incident on the FPE 100 at exactly normal incidence because normal incidence light may be entirely reflected by an etalon back toward the input and not be recirculated. A portion of the light may pass through the FPE 100 and be focused on the detector array 206 by the lens 205, while another portion of the light may be reflected by the FPE 100. Rather than letting the reflected light escape, the reflected light is recirculated by mirrors 201 and 202 acting as a high-reflectivity retro-reflector back to the FPE 100 at a slightly larger angle. This process repeats at increasing incident angles until all the light within the FPE wavelength range has been transmitted to the detector array 206. As a specific example when system 200 is a spectrometer, a beam of light containing several wavelengths may shine from the left, entering the spectrometer via a slit between two mirrors 201, 202. The light is collimated and hits the etalon, FPE 100. The light of a first wavelength ($\lambda_1$) may be transmitted and focused on the right focal plane. Light of other wavelengths, such as a second wavelength ($\lambda_2$) and third wavelength ($\lambda_N$), may be reflected back to the left, focused by the collimating lens 203, may hit the top mirror 201, come to a focus, hit the bottom mirror 202 and then may be returned toward the etalon from the left at a virtual image point farther from the optical axis than the first pass. The light is then re-collimated and hits the etalon. Now the light of the second wavelength ($\lambda_2$) is transmitted and focused on the right focal plane. The light of the third wavelength ($\lambda_N$) is reflected back to the left and repeats the process with a virtual image point even farther from the optical axis than the second pass. With each successive pass, the beam is incident on the etalon at a higher angle and a different wavelength is transmitted to the detector array 206. The optical design of system 200 takes the light rejected by the initial etalon reflection and redirects it back to the etalon at a higher AOI. The light reflected the second time is reflected again at a further increased AOI and this process is repeated until the light has all dissipated. The angular step-size between wavelengths is exaggerated in the illustrations herein to avoid confusion. The angles may be spaced more closely than illustrated, limited only by the input beam spot size, the gap between the retro-reflecting mirrors, and optical aberrations. The light will continue to recirculate at ever increasing angles until no light remains or the beam gets clipped by the outer edge of the optics. As shown, each wavelength is imaged to a unique spot in the focal plane to the right of the etalon. These could be measured with the detector array 206 or coupled into individual optical fibers, as examples. As a specific example, the detector array 206 on the right side of the filter measures each transmitted wavelength separately. RES provides improved efficiency and throughput compared to current systems that do not recycle the signal light.

While illustrated as receiving input multi-wavelength light and including a detector array 206, the same principals illustrated in FIG. 2 may be reversed to generate a multi-wavelength light output. The detector array 206 may be substituted with a transmitter array and separate wavelength light signals may be output by the transmitter array and combined by the FPE 100, lenses 203, 205, and mirrors 201 and 202 in the opposite manner as illustrated in FIG. 2 to generate a combined light output.

Figure 3:
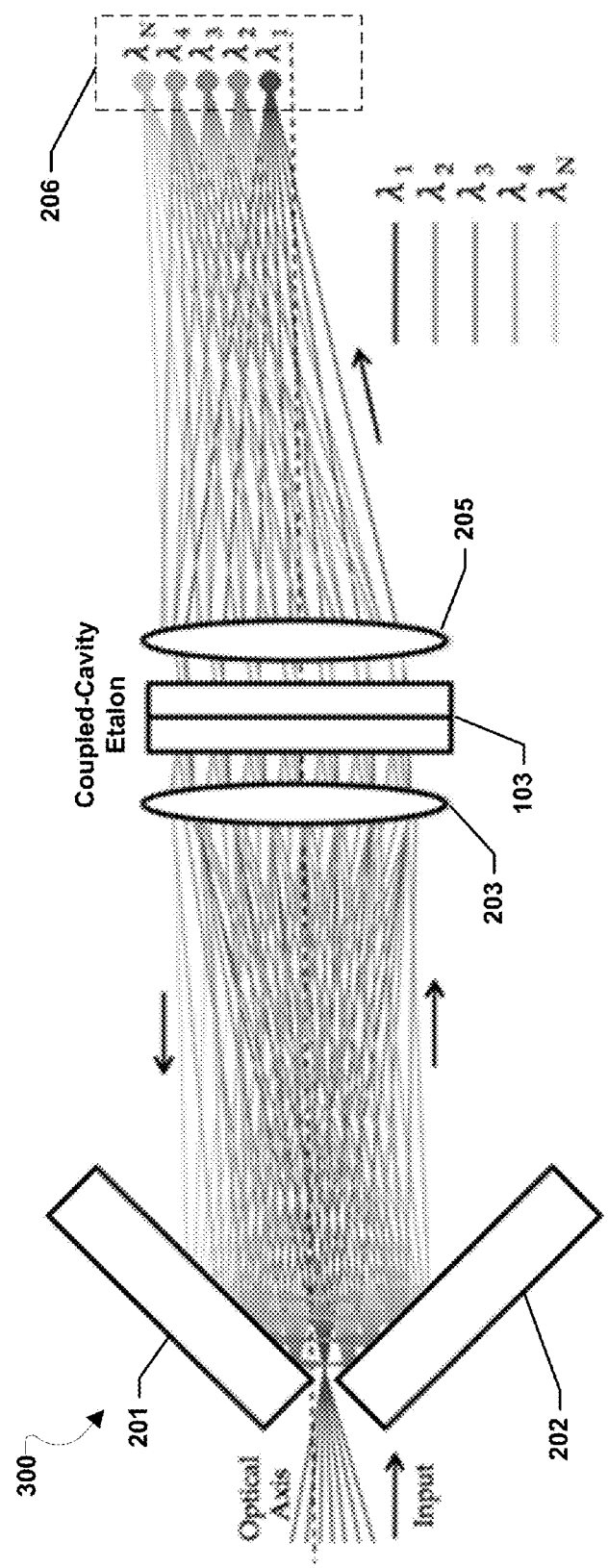

FIG. 3 illustrates an embodiment system 300 including the Recirculating Etalon Spectrometer technology where coupled-cavity etalon is incorporated into RER providing improved spectral resolution and more distinct wavelength channels at the detector array 206. The system 300 is similar to the system 200 described above, except that the etalon in system 300 may be a coupled-cavity etalon 103, rather than a FPE 100. The system 300 may operate in a manner similar to system 200, such that a portion of the light may pass through the coupled-cavity etalon 103 and be focused on the detector array 206 by the lens 205, while another portion of the light may be reflected by the coupled-cavity etalon 103. Rather than letting the reflected light escape, the reflected light is recirculated by mirrors 201 and 202 acting as a high-reflectivity retro-reflector back to the coupled-cavity etalon 103 at a slightly larger angle. This process repeats at increasing incident angles until all the light within the coupled-cavity etalon wavelength range has been transmitted to the detector array 206. Incorporating coupled-cavity etalon 103 into the RES improves the performance when compared with an FPE etalon. With an FPE etalon, the system may be limited by the number of recirculations and the spacing between distinct spectral channels. coupled-cavity etalon 103 increases the wavelength resolution and enables closer channel spacing as illustrated graphically a comparison of FIGS. 2 and 3. This results in a very efficient, high resolution spectrometer. The embodiment Recirculating Etalon Spectrometer designs may have both high resolution and high photon efficiency. These embodiment designs may be used to improve the current wavelength division multiplexing systems in the telecommunications industry. In general, optical filters are required in Lidar instruments to filter sunlight and increase signal-to-noise ratio (SNR). The Recirculating Etalon Spectrometer measurement techniques of the various embodiments build on that receiver technology to both filter the noise and separate different laser wavelengths. The standard method of separating the laser pulses is strictly temporal, while the various embodiments may resolve pulses both temporally and spectrally.

While illustrated as receiving input multi-wavelength light and including a detector array 206, the same principals illustrated in FIG. 3 may be reversed to generate a multi-wavelength light output. The detector array 206 may be substituted with a transmitter array and separate wavelength light signals may be output by the transmitter array and combined by the coupled-cavity etalon 103, lenses 203, 205, and mirrors 201 and 202 in the opposite manner as illustrated in FIG. 3 to generate a combined light output. This may make the system a wavelength division multiplexer as well as a de-multiplexer.

Figure 4:
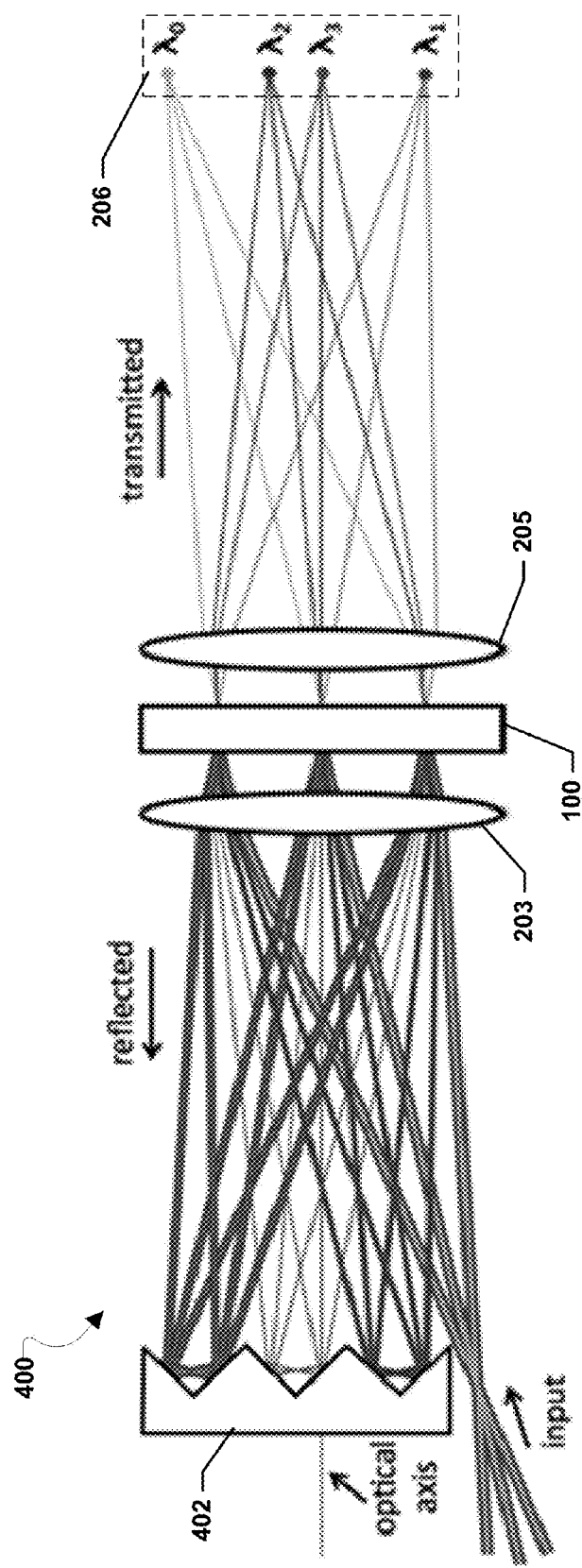

FIG. 4 illustrates an embodiment system 400 including a saw-tooth retro-reflector 402. The system 400 is similar to the system 200 described above, except that the mirror 201 and 202 may be replaced with the saw-tooth retro-reflector 402. The etalon 100 in system 400 may be any type of etalon, such as an FPE or coupled-cavity etalon. The system 400 may operate similarly to the systems 200 and 300 described above. In the system 400, each reflection from the etalon 100 may have its own retro-reflector section on the saw tooth retro-reflector 402. In the system 400, normal incidence may be achieved as well as other interesting features at the expense of a slightly more complicated arrangement. In the arrangement of system 400 it is possible to start at higher angles and work toward normal incidence. The reflector array shown (i.e., saw-tooth retro-reflector 402) is rather large for illustrative purposes, but the angular step size can be quite small—for example, only limited by the manufacturing of the reflector.

Figure 5:
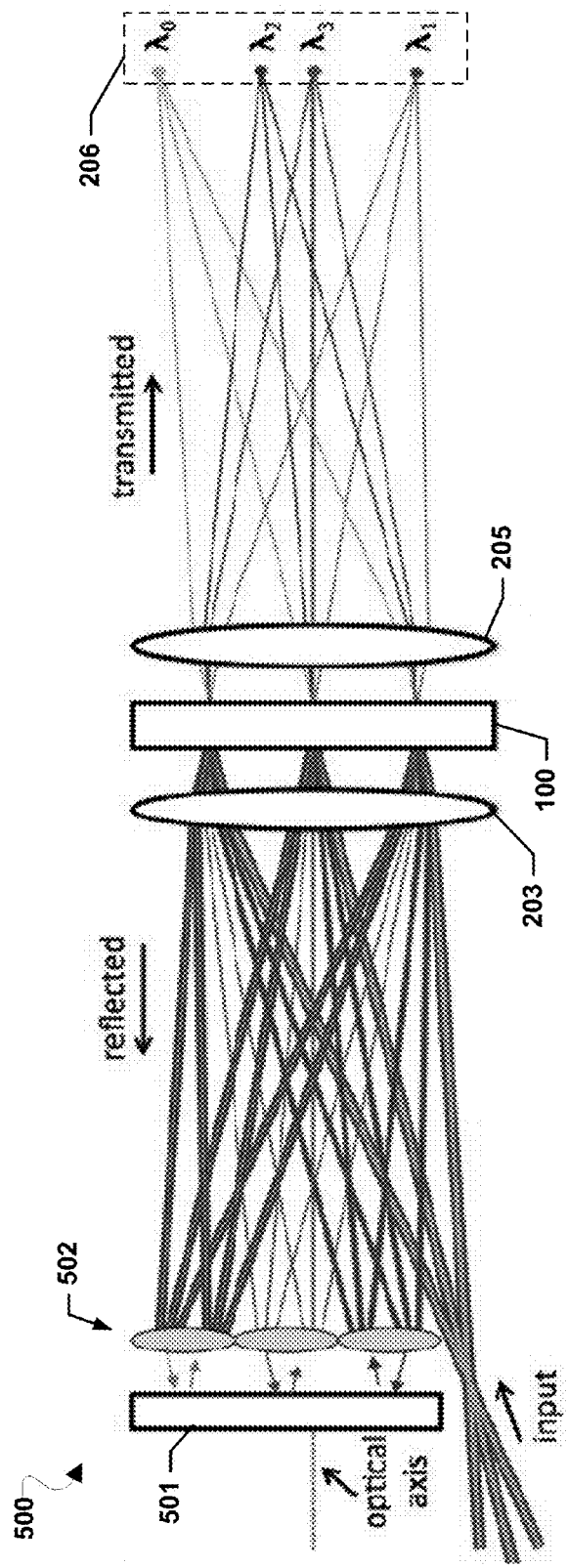

FIG. 5 illustrates an embodiment system 500 including cats-eye reflector array including a mirror 501 and a series of cats-eye lenses 502, such a one, two, three, four, or more lenses. The system 500 is similar to the system 400 described above, except that the saw tooth retro-reflector 402 may be replaced with the cats-eye reflector array. The etalon 100 in system 500 may be any type of etalon, such as an FPE or coupled-cavity etalon. The system 500 may operate similarly to the systems 200, 300, and 400 described above.

While illustrated as receiving input multi-wavelength light and including a detector array 206, the same principals illustrated in FIGS. 4 and 5 may be reversed to generate a multi-wavelength light output. The detector array 206 may be substituted with a transmitter array and separate wavelength light signals may be output by the transmitter array and combined by the etalon 100, lenses 203, 205, and the saw tooth retro-reflector 402 or cats-eye reflector array in the opposite manner as illustrated in FIGS. 4 and 5 to generate a combined light output.

Figure 6:
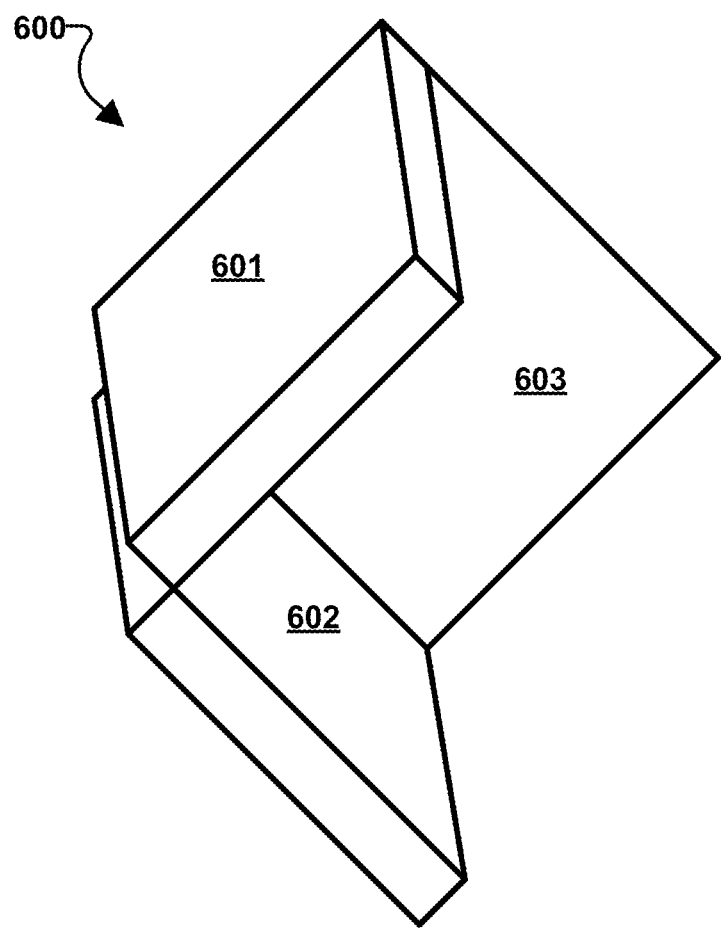
FIG. 6 illustrates a corner cube retro-reflector suitable for use in various embodiments.

FIG. 6 illustrates a corner cube mirror 600 that may be substituted for the various retro-reflectors described above in the systems 200, 300, 400, and/or 500. The corner cube mirror 600 includes three mirrors, 601, 602, and 603. The first mirror 601 and second mirror 602 may be oriented over one another in a roof prism configuration. The third mirror 603 may be oriented perpendicular to the other two mirrors 601 and 602. The corner cube mirror 600 may have a hole at the vertex of the three mirrors 601, 602, and 603, and the vertex of the three mirrors 601, 602, and 603 may be set off from the optical axis of the system the corner cube mirror 600 may be used in, such as systems 200, 300, 400, and/or 500. The third mirror 603 may take the reflections out of a single plane and complicate the recirculation pattern of the systems 200, 300, 400, and/or 500 such that additional wavelengths may be filtered/combined in the various embodiments.

Various embodiments demonstrate the use of completely fixed optical components. In additional embodiments, it may be advantageous to allow etalon-scanning to optimize the transmission of one or more wavelengths. Improved wavelength coverage may also be accomplished by adjusting the initial beam displacement.

The various embodiment spectral resolving techniques may be applicable to a wide range of applications for de-multiplexing wavelengths. Although the various embodiment spectral resolving techniques work for passive systems, the various embodiment spectral resolving techniques may also work for active applications. In relation to Lidar, the embodiment Recirculating Etalon Spectrometer technology may improve performance for altimetry/mapping missions, trace-gas Lidars, and/or Doppler wind systems. For the altimetry measurements, the wavelength may be used solely as a means to differentiate laser pulses that are closely spaced in time. For the differential absorption measurement, the wavelength may be used both to differentiate pulses and as a fundamental part of the measurement so the relative intensities of different wavelengths are compared to get the absorption profile. For a Doppler wind system, a Recirculating Etalon Spectrometer may be a more efficient, higher resolution spectrometer for making better Doppler shift measurements with fewer photons.

The higher pulse repetition frequency (PRF) achieved by the various embodiments also specifically addresses a major criticism of those trace-gas Lidars that are limited to 10 KHz. In an ideal scenario, the different wavelengths enabled by the various embodiments sample the same column of atmosphere and the same footprint so the only changes in return would be wavelength dependent. In a 10 KHz Lidar in low-earth orbit, the ground-spacing between consecutive laser pulses is approximately 1 meter. If sampled with 8 wavelengths, that means the system has moved approximately 8 meters in one wavelength scan. In a higher PRF instrument the spacing on the ground between these pulses is much closer together, which removes a potentially large error source from the measurement by getting much closer to the ideal case of overlapped sampling. This enables smaller laser footprints and a smaller receiver field of view, which in turn decreases noise.

In various embodiment Recirculating Etalon Spectrometer technologies, performance may be improved by minimizing round trip loss and designing around the angular acceptance of the higher order channels. The key to minimizing round trip loss may be being able to build high transmission etalons. This may be optimized with high quality surfaces and low scattering optical coatings and can also be traded with finesse. The angular acceptance of etalons may be reduced at higher angles, which may be managed with aperture size, high index etalon materials, instrument field of view (FOV), and/or combinations of the same.

A proof-of-concept version of the recirculating etalon spectrometer (RES) was built. For the demonstration aspheric lenses and dielectric coated mirrors were used. A PZT air-gapped etalon (from Queensgate, Inc) that at 532 nm wavelength has a Free Spectral Range of 600 pm (Air-gap is 236 microns), a finesse of approximately 27 and a FWHM band pass width of approximately 23 pm was used. The laser wavelength was monitored with a commercial wavelength meter to compare the results with the RES.

Figure 7B:
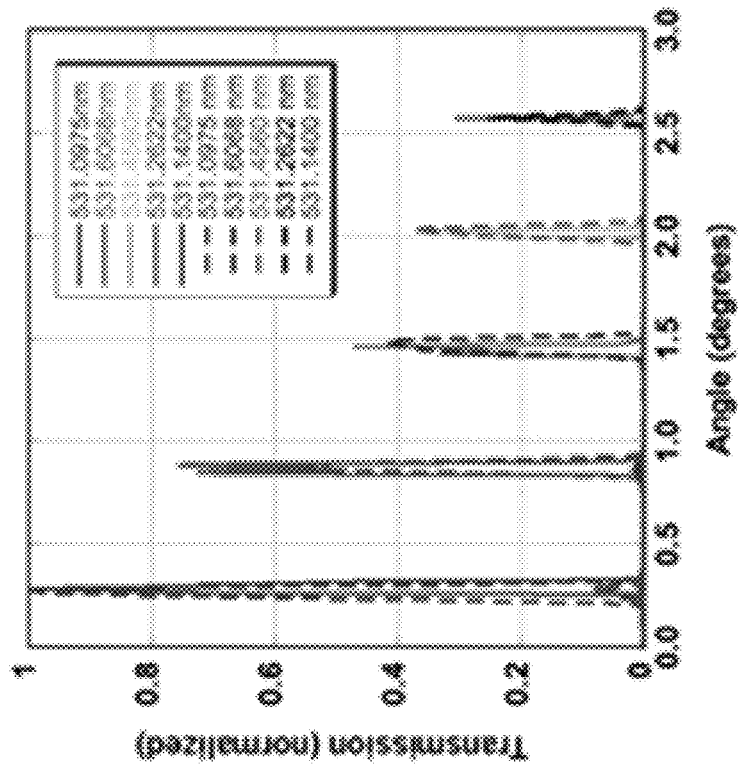
FIG. 7B illustrates a graph of the spectrometer output with five different narrow spectrum wavelength inputs. The dashed lines represent modeled curves and the solid lines represent measured data.
Figure 7A:
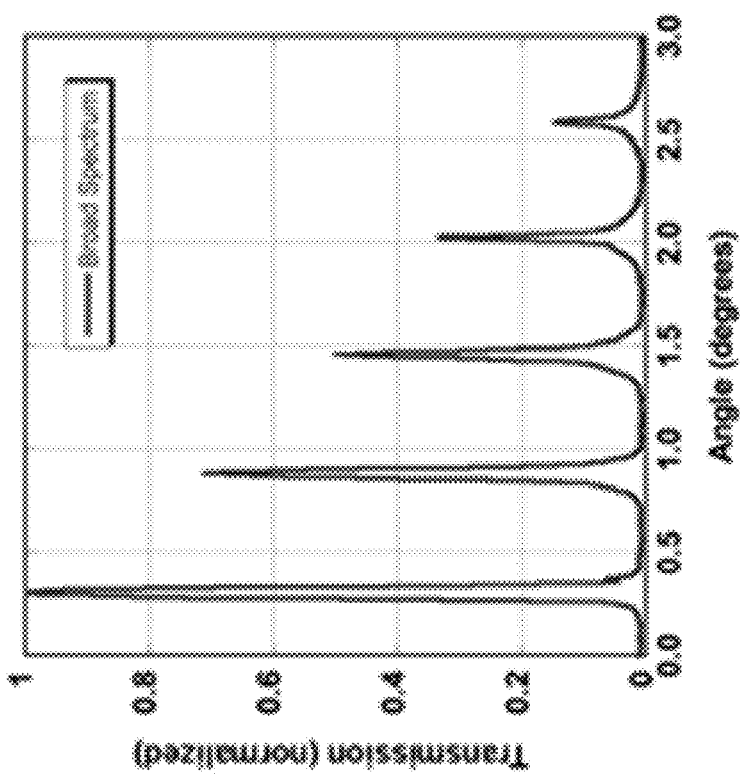
FIG. 7A illustrates a graph of the spectrometer output with a broad spectrum input.

The recirculating optics concept was tested with a multimode-fiber-coupled green LED. This tested the recirculating performance independent of wavelength and gave insight into the alignment and round-trip loss of the system. This was successfully demonstrated and results are shown in FIGS. 7A and 7B. Alignment of the system is important for optimal performance. The two most important factors are getting the input light focused right at the slit between the two recirculating mirrors and adjusting the collimating lens for optimal collimation. In practice, manual 3-D linear translation stages on the input lens and the collimator are sufficient. Using the LED (or any broad wavelength source) to visualize all the channels simultaneously simplifies alignment because all the spots can be brought into focus together. The optical model of this configuration shows the collimating lens can be off by as much as ±0.28 mm before the channels bleed into one another. Tighter alignment is required for smaller angle separations; however the alignment tolerance is practical. After demonstrating the recirculation technique with the broad-band source, a frequency-doubled 1062 nm DFB diode laser producing 531 nm single-mode-fiber-coupled output was used. This yields a single spatial mode, wavelength tunable, narrow spectrum light source. The laser source was tuned to different wavelengths, which were sorted into distinct channels shown in FIG. 7B. No changes were made to the RES while the laser wavelength was tuned. This demonstrates the essentials of a wavelength division multiplexing (WDM) system, though the device may be calibrated for use as a spectrometer to determine an unknown wavelength.

The ray-tracing program (TracePro®) was used to model the theoretical performance of the RES and compare it to the measured data. The etalon performance characteristics were measured and used in a matching MathCad® model to program the filter response in the TracePro model. The RES prototype was modeled and the results are shown in FIG. 7B as dotted lines. In this prototype the overall light efficiency is limited by the loss in the etalon and a non-optimized optical design. Optimizing the design for low round trip loss will significantly increase the overall efficacy, but the basic functionality of the design is demonstrated with both the prototype and the model. Even for the current configuration, approximately 2.8 times more light is transmitted through this system in the 5 channels than is transmitted for the same etalon without the recirculated light. For many applications, this is a significant increase in photon efficiency and could be improved with lower round-trip loss and higher etalon transmission.

Using geometric optics and the paraxial approximation, it can be shown that the $i^{th}$ AOI, $\theta_i$, is given by:

$$\theta_i = \frac{x_{offset}}{f_1}(1 + 2i); i = 0, 1 \ldots \quad (1)$$

where $x_{offset}$ is the distance the input beam is shifted from the optical axis, $f_1$ is the collimating lens focal length and i is the number of recirculations the beam has made through the optics. To avoid clipping losses on the input and during the initial recirculation, geometry yields the condition:

$$2x_{offset} \geq \text{slitwidth} \geq w_0 \quad (2)$$

where $w_0$ is the incoming focused spot diameter, and the slit width is the distance between the two retro-reflecting mirror edges. (This assumes the mirror coating comes right to the edge of the mirror. In practice this may not be true and that edge effect would need to be accounted for.) The position of the $i^{th}$ transmitted spot, in the focal plane is given by:

$$x'_i = -\left(\frac{f_2}{f_1}\right)(1 + 2i)x_{offset}; i = 0, 1 \ldots \quad (3)$$

where $f_2$ is the focusing lens focal length. The optical axis is normal to the etalon and passes through the center of lens 1 and we assume lens 1 & 2 have the same optical axis. It can be shown by sequentially tracing the optical path, the energy at a given wavelength of the $n^{th}$ spot in the image plane, $E_n(\lambda)$, can be represented by:

$$E_n(\lambda) = \begin{cases} E_{input}T_{SP}(T_{RT})^n T_E(\theta_n, \lambda); n = 0 \\ E_{input}T_{SP}(T_{RT})^n \left[\prod_{i=0}^{n-1} 1 - T_E(\theta_i, \lambda) - A_E\right] T_E(\theta_n, \lambda); n > 0 \end{cases} \quad (4)$$

where $E_{input}$ is the energy entering the spectrometer, $T_{SP}$ is the single-pass transmission through the collimating and focusing lenses, $T_{RT}$ is the round-trip transmission for 1 iteration through the recirculation optics, $T_E(\theta,\lambda)$ is the etalon transmission (given by the etalon equation), $A_E$ is the etalon loss due to absorption and scattering and $\lambda$ is the wavelength.

Figure 8:
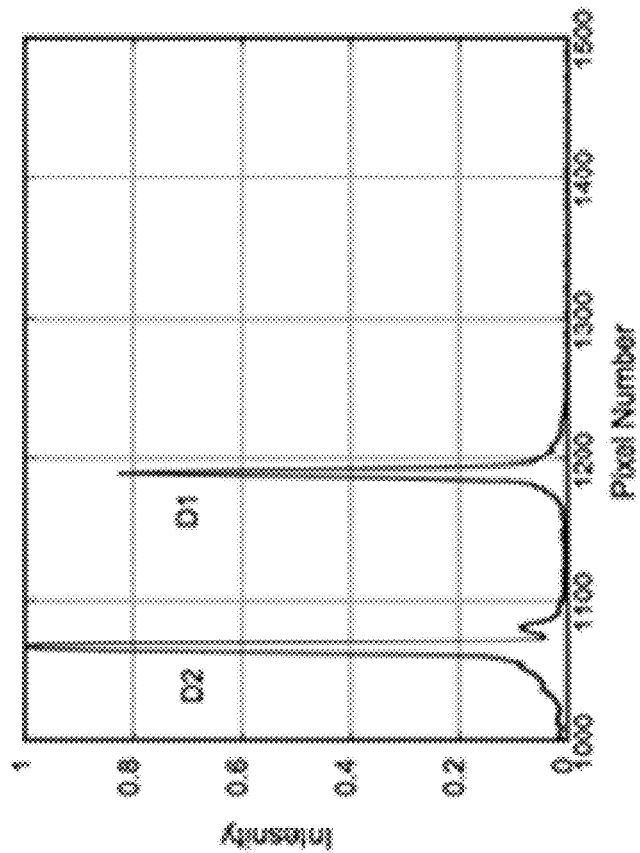
FIG. 8 illustrates graphs comparing a sodium lamp spectra from a conventional scanning grating spectrometer (the left graph) and a recirculating etalon spectrometer (the right graph).
Figure 8:
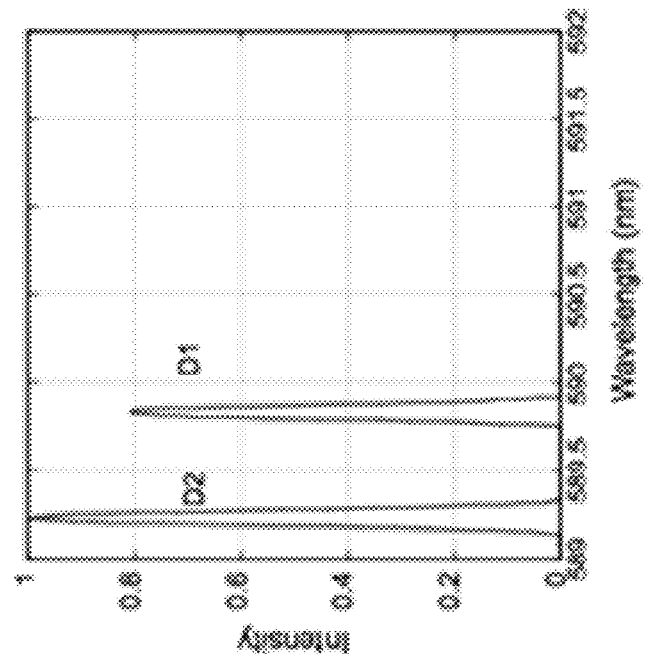

From equation 4, it is clear that in order to maximize $E_n$ for large n, the round trip loss and etalon loss must be minimized. If achievable numbers for the terms in equation 4 are used (e.g. $T_{SP}$=99%, $T_{RT}$=99%, $T_E(\theta,\lambda)$=95%, $A_E$=3%), the result may be approximately 80% transmission for the $5^{th}$ spot. If lower values are assumed, (e.g. $T_{SP}$=98%, $T_{RT}$=98%, $T_E(\theta,\lambda)$=90%, $A_E$=6%), the result may be approximately 60% transmission for the $5^{th}$ spot. The surface quality on the recirculating mirrors does not need to be extremely good because only a small area is being used because the beam is at a near focus. High reflectivity is important as can be seen above but commercial mirrors are available with much better than 99% reflectivity. This means the etalon transmission and absorption are critical factors in a low loss system One important application for the various embodiments may be atomic and molecular spectroscopy in photonstarved scenarios such as remote sensing instruments. To illustrate the utility, the RES was configured for simultaneous measurement of the sodium D1 and D2 lines whose separation is 0.6 nm. The experimental arrangement was such that the light source was a Philips 234047-SOX-E18 low-pressure sodium light bulb coupled into a multi-spatial mode fiber and the wavemeter being a scanning grating spectrometer (ANDO Model AQ6315B). The etalon air-gap spacing was 236 microns (FSR at 589 nm=735 pm). The etalon air-gap spacing and lens offset were adjusted so that, with recirculation, both the D1 and D2 lines were resonant and transmitted through the etalon simultaneously (i.e. within the recirculation time). The graphs of FIG. 8 compare the spectra of the sodium lamp from the grating spectrometer (left) and the Recirculating Etalon Spectrometer— (right). In a traditional etalon set-up, either D2 at one angle or D1 at another angle would be observed, but this experiment with the embodiment RES showed both lines simultaneously illustrating the potential improved photon efficiency.

A prototype of a recirculating etalon spectrometer has been built and its basic functionality and utility have been demonstrated. The current prototype was built around a PZT etalon. There are a number of alterations that may be made according to the various embodiments, as well as a number of different optical configurations suitable for use with the various embodiments that may achieve similar results as described above. For example, the various embodiments are illustrated using all spherical (or aspherical) lenses. However, because all the wavelength dispersion happens in a single plane, the lenses may be replaced with cylindrical lenses allowing other functions to occur in the orthogonal axis (e.g., a grating separating wavelengths in the y-axis would enable use of the RES over many free-spectral ranges without ambiguity). In general there is a great deal of freedom in the selection of the lens design that may be tailored for a specific application. A primary factor in lens selection may be the etendue of the system. The field of view (FOV) of an etalon is maximum at normal incidence and decreases at higher angles, so the lens design, aperture, and spatial mode quality may need to match the FOV of the etalon at the largest AOI used to maintain good transmission at those angles. As demonstrated in the prototype, this may be achieved but system performance for a given application and may depend on the correct trade between the aperture, f# of the collimator, and aberrations and walk off from repeated recirculations of the beam. Also the collimating lens and focusing lens may be different so the focusing lens may be selected for the focal plane requirements while the collimating lens may be designed to impact recirculation performance.

One feature of this recirculating configuration should be noted: the increase in AOI in successive round trips is constant but because the wavelength transmission peak is not a linear function of AOI for an etalon, the wavelength step size is not constant for each successive round trip. However, (aside from the usual etalon ambiguity resulting from the free spectral range) there is a one-to-one mapping of angle to wavelength so the RES of the various embodiments may be calibrated to measure the spectra accurately but the mapping function is more complicated due to the iterative nature of the measurement. The free spectral range ambiguity inherent to etalons may be resolved by passing the light through a band-pass filter that corresponds to the range of interest.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

What is claimed is:

1. A system, comprising:
   a retro-reflector;
   a detector or transmitter array; and
   an etalon disposed between the retro-reflector and the detector or transmitter array,
   wherein the retro-reflector is configured to redirect light reflected by the etalon back to the etalon at a different angle of incidence than an original angle of incidence on the etalon of the light reflected by the etalon.

2. The system of claim 1, further comprising:
   a first lens disposed between the retro-reflector and the etalon; and
   a second lens disposed between the etalon and the detector or transmitter array.

3. The system of claim 2, wherein the etalon is a Fabry-Perot etalon.

4. The system of claim 2, wherein the etalon is a coupled-cavity etalon.

5. The system of claim 4, wherein the retro-reflector is a roof prism comprised of two mirrors with a center space between the two mirrors.

6. The system of claim 4, wherein the retro-reflector is a saw-tooth retro-reflector.

7. The system of claim 4, wherein the retro-reflector is a cats-eye reflector.

8. The system of claim 4, wherein the retro-reflector is a corner cube mirror.

9. The system of claim 4, wherein:
   the detector or transmitter array is a detector array; and
   the retro-reflector is configured such that the different angle of incidence is a higher angle than the original angle of incidence.

10. The system of claim 9, wherein the first lens is a collimating lens and the second lens is a focusing lens.

11. The system of claim 10, wherein the system is a Light detection and ranging system.

12. The system of claim 4, wherein the detector or transmitter array is a transmitter array.

13. A method, comprising:
    receiving a beam of light at an original angle of incidence at an etalon;
    transmitting a first portion of the beam of light through the etalon to a detector array;
    reflecting a second portion of the beam of light to a retro-reflector;

reflecting the second portion of the beam of light from the retro-reflector back to the etalon at a different angle of incidence than the original angle of incidence; and transmitting at least a portion of the second portion of the beam of light through the etalon to the detector array.

14. The method of claim 13, wherein the different angle of incidence is a higher angle than the original angle of incidence.

15. The method of claim 14, wherein the etalon is a Fabry-Perot etalon or a coupled-cavity etalon.

16. The method of claim 15, wherein the retro-reflector is a roof prism, a saw-tooth retro-reflector, a cats-eye reflector, or a corner cube mirror.

17. The method of claim 13, further comprising successively repeating the reflecting steps between the retro-reflector and the etalon such that each subsequent portion of the beam of light is incident on the etalon at a higher angle of incidence than a previous portion of the beam of light.

\* \* \* \* \*